Jan. 17, 1939.  W. L. BURNER  2,143,934
DUMP CAR
Filed Dec. 24, 1927  4 Sheets-Sheet 1
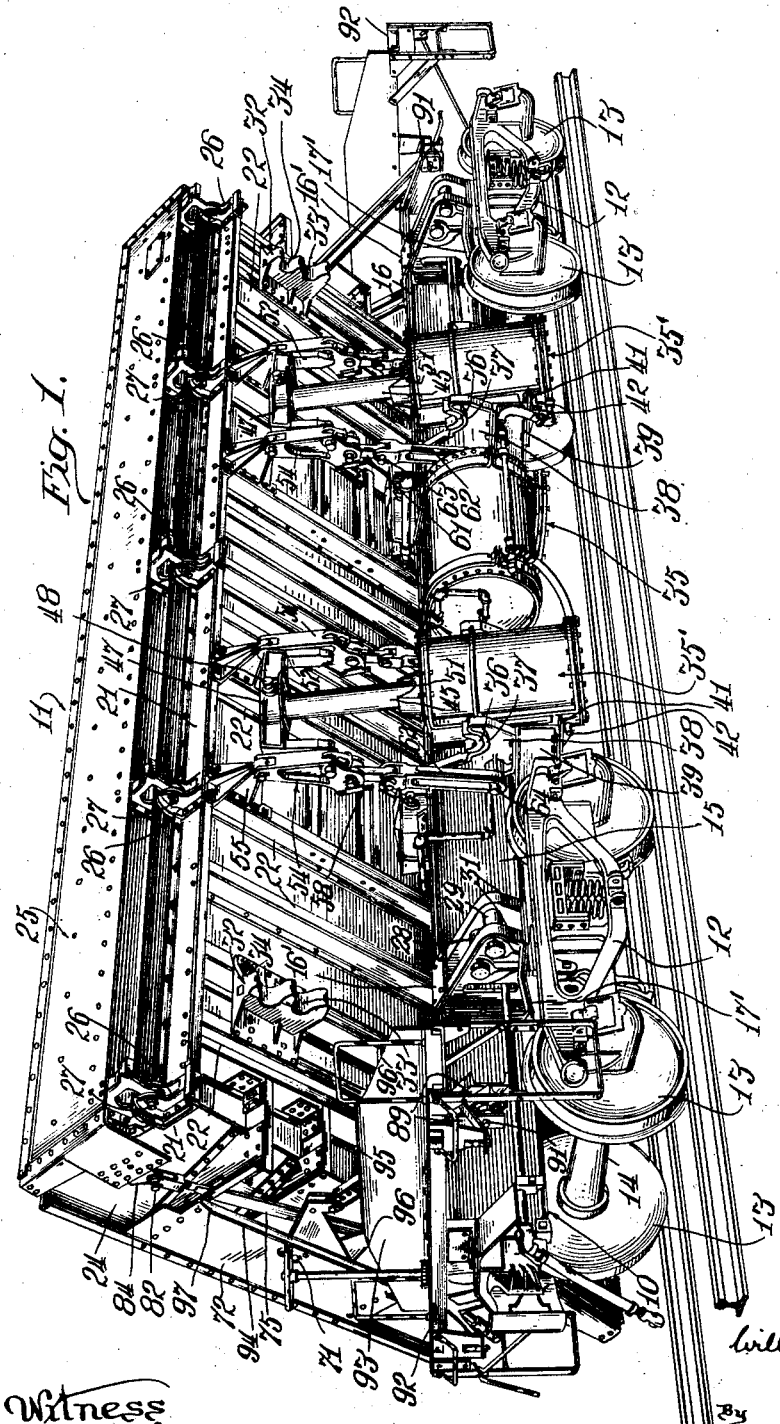

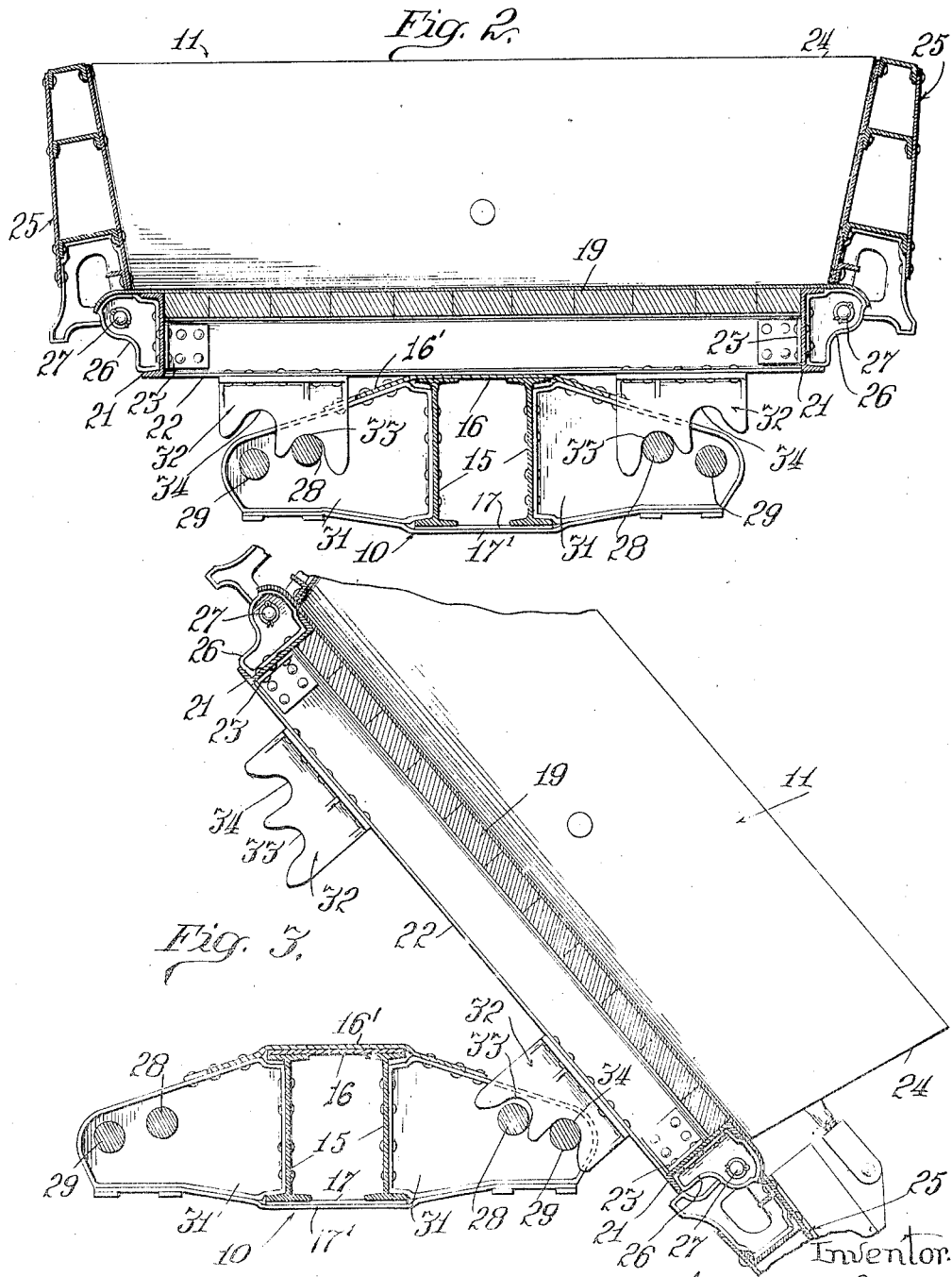

Jan. 17, 1939.  W. L. BURNER  2,143,934
DUMP CAR
Filed Dec. 24, 1927  4 Sheets-Sheet 4

Witness
Milton Lenoir

Inventor.
William L. Burner.
By John L. Jackson.
Attorney.

Patented Jan. 17, 1939

2,143,934

UNITED STATES PATENT OFFICE 2,143,934

DUMP CAR

William L. Burner, Columbus, Ohio, assignor, by mesne assignments to Western-Austin Company, Aurora, Ill., a corporation of Illinois Application December 24, 1927, Serial No. 242,367

85 Claims. (Cl. 105—273)

The present invention relates to dump cars of the type in which the body or bed of the car is tiltably mounted on the under frame for laterally dumping its load to either side of the road bed.

The invention has as one of its principal objects to provide an improved construction of power operated mechanism for tilting the bed to dumping position, and more specifically in this regard, to provide a construction of tilting mechanism which will incline the bed to a relatively steep dumping angle; to provide a tilting mechanism which will have a motion multiplying characteristic so that the steep dumping angle of the bed can be obtained from a single-stroke power cylinder having a comparatively short stroke; and to provide a tilting mechanism which will have a variable ratio of leverage and velocity of movement so that in the initial part of the dumping movement, when the load is greatest on the power cylinder, the tilting mechanism will be operating at a maximum mechanical advantage, and after the load has started to dump, the motion of the bed will be accelerated to impart a quick, final throw thereto for clearing the bed of material tending to remain therein.

Another object of the invention is to provide an improved arrangement of supporting pivots on which the bed turns in its tilting movement on the under frame, and more specifically in this regard to provide an arrangement of dual pivots cooperating with the bed tilting mechanism so that in the initial part of the dumping movement when the greatest power is required, the bed will tilt around a pivotal center which is quite close to the center of gravity of the bed, and after the bed has started to dump its load the bed will be caused to tilt about a second pivotal center spaced outwardly from the first named center so that the final part of the dumping movement will occur around this outer pivot. By thus transferring the weight of the bed from one pivotal center outwardly to another pivotal center during the dumping operation, the possibility of shock occurring to the car or to the track when the bed reaches the extremity of its tilting movement is substantially eliminated. Moreover, by thus shifting the pivotal center outwardly in this manner there is no possibility of the center of gravity of the bed passing "over center", nor reaching such a condition of balance that the bed will not return under its own weight when the power cylinders are exhausted. Such arrangement of dual pivots thus cooperates with the power tilting mechanism for securing maximum mechanical advantage during the initial part of the tilting movement; for permitting the quick, final throw of the bed without causing shock at the end of the dumping movement; and for assuring the return of the bed to normal position as the cylinders are being exhausted.

Another object of the invention is to provide a dump car having either or both of the above recited operating features and which is further characterized by the fact that the bed is normally supported in substantially stable equilibrium on the under frame during loading and transport, so that the complications and uncertainties of locking devices for holding the bed in its normal upright position are avoided.

The invention also embraces numerous other features of improvement which will appear at length in the following description of a preferred embodiment of the invention. In the drawings illustrating such embodiment:

Figure 1 is a perspective view of the car, showing the bed at the upper limit of its dumping movement.

Figure 2 is a transverse sectional view adjacent to the end of the car, showing the arrangement of the dual pivots.

Figure 3 is a similar view showing the bed tilted to its maximum dumping angle and showing the transposition of the bed to the outer pivot.

Figure 4:
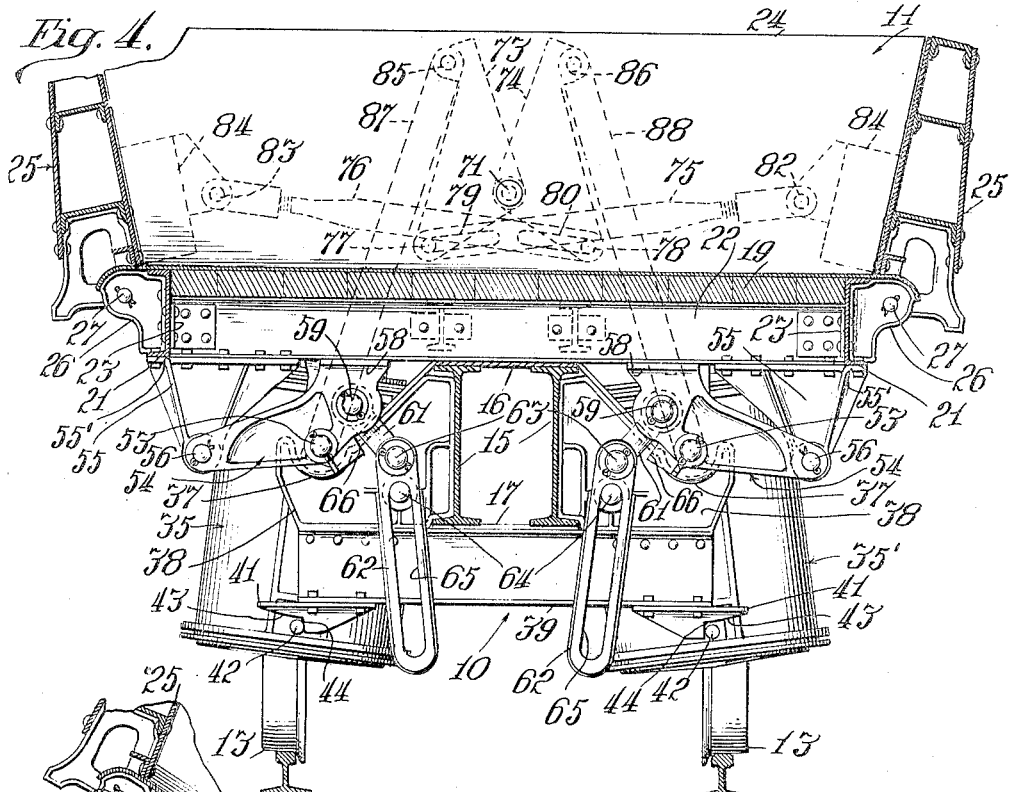
Figure 4 is a transverse sectional view on a plane somewhat closer to the center of the car, and showing the power lift mechanism.

The under body or frame is designated 10 in its entirety, and the tilting bed which is supported thereon is indicated in its entirety at 11. The under body 10 comprises the usual trucks 12 in which are journaled the car wheels 13, such car wheels being mounted on axles 14 extending outwardly into journal boxes in the trucks in accordance with conventional railway practice. Extending longitudinally over the tops of the trucks 12, and having the usual spring suspension on said trucks, is a center sill comprising two parallel I-beams 15 which constitute the main frame of the under body. These I-beams are of considerable depth, and are cross-connected by transversely extending upper and lower plates 16 and 17.

The car bed 11 comprises any suitable construction of floor 19 mounted on longitudinally extending sill rails 21 and transversely extending beams 22. As shown in Figure 1, the beams or bars 22 are placed in closely spaced relation along the under side of the bed, the outer ends of such beams being secured to the sill rails 21 by angle brackets 23 (see Fig. 2). The ends of the bed are closed by fixed end walls 24, and the sides of the bed are normally closed by pivotally swinging side gates 25. Brackets 26 are secured to the outer sides of the bed sills 21 at spaced points along the length of such sills, and the side gates 25 have pivotal support in such brackets on pivot pins 27.

When the bed is in its normal position (Fig. 2) it rests on the tops of the sills 15, or upon the upper cross plate or plates 16 which extend transversely of said sills. Thus the weight of the bed and its load is carried directly upon the sills 15. The bed also has support when in its normal position on outwardly spaced fulcra around which the tilting operation occurs. Hence if there is any tendency for the bed to tip, as when the car is traveling around a curve, or because of unequal distribution of the load in the bed, such tipping is prevented by these outwardly spaced points of fulcrum support. I shall first describe the dual pivots which are located adjacent to the ends of the car, and shall then describe the intermediate bed supporting pivots which are associated with the tilting mechanism.

As shown in Figures 2 and 3, these dual pivots consist of two heavy pivot bars or pins 28 and 29, which are carried by the under body 10. The bed is adapted to tilt in either direction and hence there is a corresponding pair of these pivots at each side of the under body. Such pivots extend longitudinally between two closely spaced frame members 31, an open space or channel being defined between these frame members as shown in Figure 1. Said frame members are riveted to the center sills 15, and their attachment to said sills is also reinforced by extending upper and lower plates 16' and 17' along the upper and lower sides of said frame members and securing said plates thereto. As shown in Figure 1, pairs of these dual pivots are located at each end of the car, preferably adjacent to the trucks 12. The bed 11 carries heavy bearing brackets 32 which cooperate with the dual pivots 28 and 29. As shown in Figure 1, such bearing brackets have relatively wide base portions which span two of the cross beams 22 and which are riveted thereto. Each bearing bracket is adapted to extend down between the frame members 31, and the under side of the bracket is formed with recessed bearing surfaces 33 and 34 for engaging on the dual pivots 28 and 29 respectively. The vertical spacing of the pivots 28 and 29, and the depth of the recesses 33 and 34, is such that the weight of the bed is transferred from one pivot to the other in the tilting movement of the bed. When the bed is in its horizontal position (Fig. 2) the bearing recesses 33 bear on the inner pivots 28. Hence if there is any tendency for the bed to tip outwardly at this time, either because of an uneven distribution of the load, or because of centrifugal force when rounding a curve, such is resisted by these outwardly spaced points of bearing support between the recesses 33 and pivots 28. Additional points of lateral support are also afforded at this time by the pivots of the tilting mechanism, which I shall later describe. As one side of the bed is tilted upwardly in a dumping operation, the other side of the bed swings around the inner pivot 28 during the first part of the dumping movement. As the bed approaches the latter part of its dumping movement the bearing recess 34 comes into engagement with the outer pivot 29 (Fig. 3), and thereafter the remaining movement of the bed occurs around this outer pivot, the inner bearing recess 33 being lifted entirely off the inner pivot 28. It will be observed that by shifting the point of pivotal support outwardly in this manner during the dumping operation, the bed can be swung up to a steeper angle without the possibility of the center of gravity of the bed passing beyond the vertical plane of the fulcrum support. It will be understood that if this occurred it would be necessary to exert power on the bed to restore it to normal position, and such is undesirable. The depths of the bearing recesses 33 and 34 are so related to the heights of their respective pivots 28 and 29 that the transposition of the fulcrum point from the inner pivot to the outer pivot results in the center of gravity of the bed moving through a path which is substantially lower than if the entire tilting movement occurred around the outer pivot 29. Such lower path of the center of gravity during the tilting movement of the bed reduces the amount of power necessary to dump the bed. Attention is also directed to the fact that during the first part of the tilting movement when the entire load and the bed must be raised, the bed swings around a center which is disposed quite close to the center of gravity of the bed. It is during this preliminary part of the dumping movement that most of the power must be expended, and by having the bed swing about the inner pivot 28 at such time the amount of power necessary to tilt the bed is considerably reduced. As the bed swings upwardly at one side, the gate 25 at the opposite side opens downwardly and the load starts to dump with the gradually increasing angle of the bed. This diminishes the load carried by the bed, with a consequent decrease in the power necessary to continue the tilting movement, and hence the point of fulcrum support can be shifted outwardly to the pivot 29 during the latter part of the tilting movement without increasing the amount of power necessary to tilt the bed. The transposal of the point of fulcrum support to the outer pivot axis 29 also effects an outward displacement of the bed which assists it to clear the dumping cylinders and the side frames of the trucks 12 when the bed is at the extreme dumping angle illustrated in Figures 3 and 6. As will be presently described, the tilting mechanism has a characteristic motion whereby accelerated movement is imparted to the bed during the latter part of the dumping operation, and by transferring the point of fulcrum support outwardly to the outer pivot 29 at such time the possibility of shock being transmitted to the car and to the track at the completion of this quick, final throw is effectively avoided. The side surfaces of the recesses 33, 34, and the side surfaces of the pivot pins 28, 29 form laterally abutting surfaces which cooperate to prevent sidewise slipping of the bed on the bearing surfaces of said recesses and pins in the tilting of the bed.

I shall now describe the power operated tilting mechanism. The bed is tilted to the right (Fig. 4) by power cylinders 35 located on the left side of the car, and similarly the bed is tilted to the left by power cylinders 35' located on the right side of the car. There are preferably two of these cylinders on each side of the car, such cylinders being disposed intermediate the end trucks 12 as shown in Fig. 1. The use of two cylinders is preferable since it enables each cylinder to be made of smaller diameter. Each cylinder is pivotally supported for oscillation about an axis extending longitudinally of the car, such oscillating support consisting of trunnions 36 extending from opposite sides of the cylinder and resting in semi-cylindrical bearing sockets 37 formed in the outer ends of the frame members 38. Said frame members are rigidly secured to the outer sides of the I-beams 15, being reinforced in their attachment thereto by the upper cross plate 16, and by a lower channel-beam 39. One of these channels 39 extends across the under sides of the sill beams 15 on each side of the cylinder 35, and is secured to the sill beams and to the frame members for reinforcing the latter, it being understood that such frame members 38 carry the pressure set up in the tilting mechanism in the operation of tilting the bed to dumping position. Secured to the ends of the transverse I-beams 39 are brackets 41 which project outwardly from the under sides of the I-beams. Pins or studs 42 project laterally from the opposite sides of each cylinder and underlie the curved surfaces 43 formed along the under sides of the brackets 41. Such pins or studs are also adapted to abut vertical shoulders 44 formed in the brackets 41. The engagement of the pins 42 against the shoulders 44 limits the extent to which the lower end of the cylinder can swing inwardly, with the bed in its horizontal position. Each pin 42 is free to swing outwardly under the curved surface 43 during the tilting of the bed, remaining under some portion of this curved surface, however, during the entire dumping movement. Hence these pins prevent any possibility of the cylinder being lifted off its trunnion supports 37 in the event that the bed should be tilted by hand or from some other source of power.

Each cylinder comprises a thrusting element which, in the construction shown, consists of the piston plunger 45, but it will be understood that this relation might be reversed if desired, as by connecting the plunger to the under body and having the cylinder reciprocate. The cylinders and their associated tilting mechanisms are all substantial duplicates, and hence it will only be necessary to describe one of these cylinders and its tilting mechanism. The piston plunger 45 passes upwardly out of the cylinder through a guide boss 46 which rises from the top of the cylinder cover. Mounted on the upper end of the plunger is a yoke 47 (see Fig. 7) which extends in a plane parallel with the length of the car. The yoke is pivotally carried on the plunger through a transversely extending pivot pin 48, whereby the yoke is free to rock in a longitudinal plane. The plunger extends into an inverted cup-shaped recess 49 which is formed in the under side of the yoke, the pivot pin 48 extending transversely through the side walls of such recess. The recess 49 is proportioned to fit down snugly over the guide boss 46 when the plunger is retracted to its lower position, such recess thereby serving to house or cover over the top of the guide boss for excluding the entrance of dust and dirt into the cylinder around the plunger. As shown in Figure 1, the outer and inner sides of the guide boss 46 are formed with notch-like depressions 51 which receive the laterally extending portions of the pivot pin 48 when the yoke is lying over the guide boss.

Figure 7:
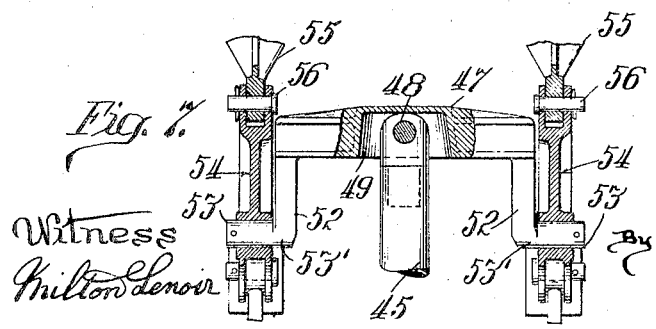
Figure 7 is a detail sectional view taken on the plane of the line 7—7 of Figure 6.

The yoke comprises a pair of arms 52 which extend downwardly from the upper portion of the yoke, and also comprises horizontally extending pivot pins 53 which are carried at the lower ends of the arms 52. Cooperating with the pivot pin 53 at each side of the yoke is a system of linkage which transmits motion to the bed, both systems of linkage on the opposite sides of the yoke being substantial duplicates. Mounted on each pivot pin 53 is a lever or rocker member 54. It will be noted that the point of pivotal support of the rocker member on the pin 53 is intermediate the ends of the rocker member. The outer arm thereof is bifurcated, as illustrated in Figure 7, and this bifurcated end engages over a bracket 55 where it receives a pivot pin 56 passing through the arms of the bifurcated portion and through a pivot boss in the bracket 55. Referring to Figure 1, such bracket is bolted to the under side of one of the transverse beams 22 of the bed, and comprises laterally extending flange portions 55' which are bolted to the lower flange of the sill rail 21 for giving the bracket lateral stability. The other arm of the rocker member 54 is formed with a relatively wide flange or plate portion 58, which constitutes a thrusting surface for bearing against the under side of the bed rail 22. This other arm is also formed with a slotted or bifurcated portion through which passes a pivot pin 59. Such pivot pin establishes pivotal connection with motion arresting links which have operative connection with the under body 10. Said links consist of an upper link 61 which extends into the bifurcated portion of the rocker member for pivotal mounting on the pin 59, and a lower link 62, which is pivotally connected at 63 to the relatively short upper link. The lower link has lost motion connection with a fixed stud 64 projecting laterally from the frame member 38, such lost motion connection being afforded by a long slot 65 which is formed in the link, and in which slot the stud 64 plays. Projecting downwardly from the under side of the rocker member 54 is a flange or rib at the inner end of which is formed an abutment or stop surface 66. Such stop surface or shoulder is adapted to engage with the outer side of the upper link 61 at certain points in the tilting movement of the bed, for a purpose which will be presently described.

Figure 5:
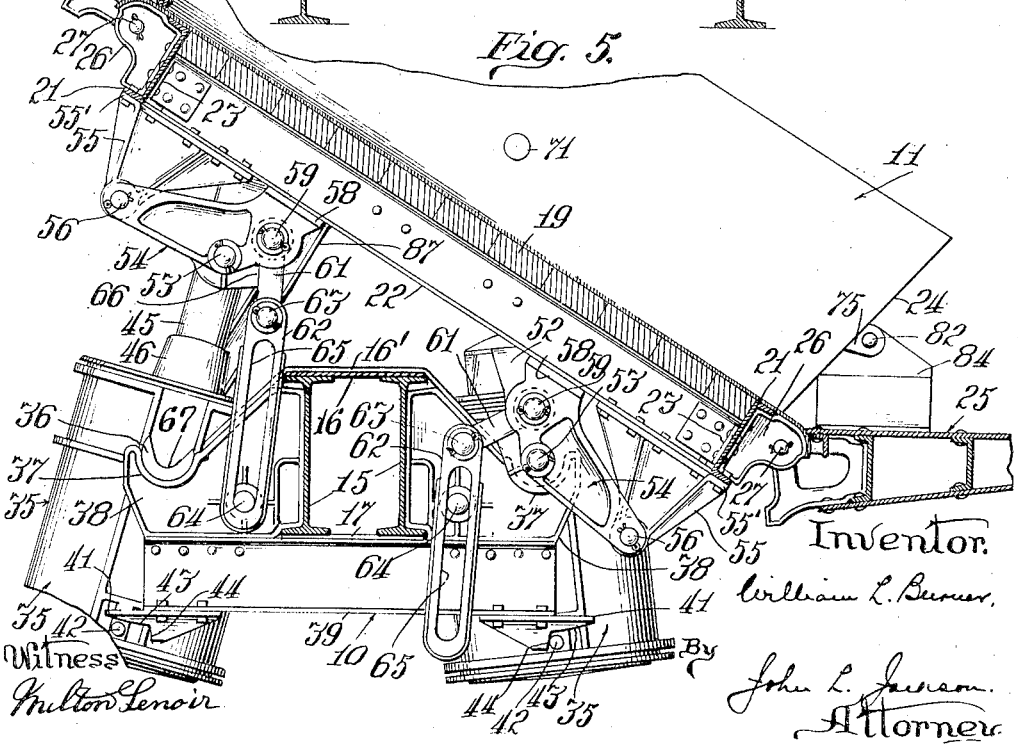
Figure 5 is a similar view showing the bed swinging upwardly through the first part of its dumping movement.
Figure 6:
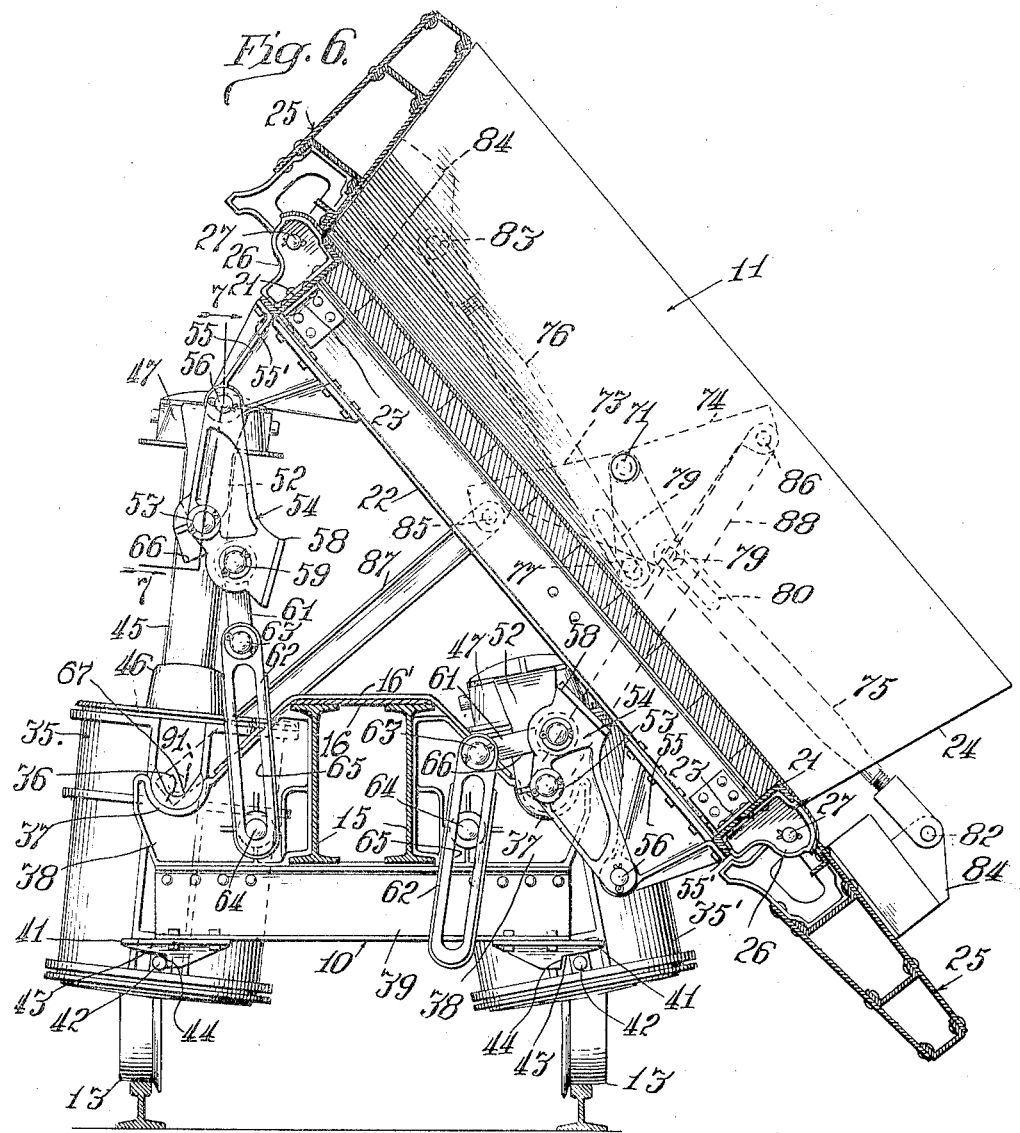
Figure 6 shows the completion of the dumping movement.

As shown in Figures 5 and 6, the upper sides of the cylinder trunnions 36 are formed with U-shaped bearing depressions 67 therein. When the bed is in its horizontal position, these bearing depressions receive bearing surfaces 53' at the inner ends of bearing pins 53 (Fig. 7) at each side of the cylinder.

When the bed is in its normal horizontal position as shown in Figure 4, the rocker members 54 at each side of the bed have load supporting engagement therewith at their opposite extremities, i. e., the pivotal connection 56 between the outer arm of each rocker and the bracket 55 affords one point of support, and the contact of the thrusting plate 58 against the under side of the bed frame affords the other point of support. At this time the plunger 45 is in its retracted position, and the bearing surfaces 53' of the yoke 47 are resting in the bearing recesses 67 of the trunnions 36. Hence, whatever load is being placed on either or both rocker members at opposite sides of the bed is being transmitted through the bearing surfaces 53' to the bearing recesses 67. When the bed is in this position the axis of the pivot pins 53 substantially coincides with the axis of the innermost pivot 28 of the dual pivots previously described. It will, therefore, be seen that the tilting mechanism affords two pivotal points of support for the bed on opposite sides of each cylinder, thus giving an effect of four available points of pivotal support on each side of the car in addition to the end points of support afforded by the dual pivots 28—29.

In tilting the bed to either side, air is supplied to the power cylinders on the opposite side for energizing the same, as shown in Figures 5 and 6. During the first part of the tilting movement the rising side of the bed travels upwardly with the same speed as the upward stroke of the plunger 45. At this time the rocker members 54 on each side of each piston have their two-point engagement with the bed, i. e., the thrusting or pressure plates 58 of such rocker members are bearing against the under side of the bed frame. Hence such rocker members move as a unit with the bed, giving the effect of a direct pivotal connection between the dumping yoke 47 and the bed. It is during this first part of the tilting movement that the greatest power is required for raising the bed and its load, and at such time the bed is moving upwardly at the same speed as the plunger 45 so that the full power of the two cylinders is being utilized. When the bed is tilted to approximately the angle shown in Figure 5, the load is in the process of dumping outwardly from the side of the bed, and from this point on less power is needed to complete the tilting motion. During this initial movement, the lower link 62 has been sliding idly up along the fixed stud 64, but when the bed reaches approximately the angle referred to, continued motion of the link 62 is arrested by the end of the slot 65 engaging the under side of the pin 64. This in turn arrests further upward movement of the pivot 59 of the rocker member. Hence from this point on the inner end of the rocker member is held against upward movement, with the result that the rocker member is caused to swing around the pivot 53 as a fulcrum. The lever arm 53—59 is relatively short compared to the lever arm 53—56, and it will, therefore, be seen that during the remaining upward movement of the plunger 45 the outer arm of the rocker member will be caused to swing upwardly at a considerably accelerated speed. Figure 6 illustrates the completion of this accelerated movement, the pressure plate 58 having left the under side of the bed frame, and the outer arm of the rocker member being swung up substantially in parallelism with the plunger 45. The motion multiplying action of the rocker member 54 causes a quick final throw to be imparted to the bed for releasing any part of the load tending to adhere to the bed. It will be noted that when the lever or rocker member 54 swings around its fulcrum pivot 53 in thus multiplying the motion or extending the effective reach of the piston rod 45, it has a direction of rotative movement on said fulcrum pivot corresponding to the direction of tilting movement of the bed, i. e., when the bed has been dumped to the right, as illustrated in Figure 6, both the lever and the bed have been rotated in a clockwise direction. Such corresponding direction of rotation of the lever 54 enables the outer end thereof to transmit tilting force very effectively to the bed through the pivot connection 56. It will also be noted that this motion multiplying or accelerating action results in the bed being swung upwardly to a much steeper angle than it would be possible to obtain if the comparatively short stroke of the power cylinder 35 were utilized directly for producing all of the tilting movement. By virtue of the present construction I can thus obtain a relatively steep dumping angle of the bed without the necessity of using telescoping or two-stroke cylinders, which is a decided advantage since these cylinders are expensive and are subject to derangement, rapid wear, etc.

The pivotal mounting of the yoke 47 on the end of the plunger 45 results in an equalizing action so that the same lifting energy is transmitted through both sets of links on opposite sides of the cylinder. The two motion arresting links 61 and 62 may be employed to limit the upward movement of the bed, such limiting action resulting from the end of the slot 65 engaging against the stud 64, and the links straightening out into substantial alinement with the rocker member 54. However, if desired, the upper limit of the tilting movement may be defined by the piston in the power cylinder engaging the upper head of the cylinder.

With reference to the pivotal action which occurs at the dumping side of the bed during a dumping operation, it will be seen from Figure 5 that during the initial part of the dumping movement the rocker member 54 at this side of the bed remains with its pressure plate 58 bearing against the bed frame. Hence the rocker member swivels freely around the pivot pin 53, the engagement of the inner portion 53' of this pin with the bearing socket 67 affording a point of support for the bed as previously described. As the inclination of the bed increases approximately to the point where the tilting linkage at the opposite side of the bed is becoming effective for accelerating the motion of the bed, the bearing brackets 32 at the ends of the bed tilt off of the inner pivots 28 and onto the outer pivots 29. This results in the remainder of the tilting movement occurring around the outer pivotal axis 29, and hence at such time the frame of the bed separates from the thrusting plates 58 of the levers or rocker members at the dumping side of the bed, as shown in Figure 6. The transposition from the inner pivot 28 to the outer pivot 29 is preferably arranged to occur just before the bed is brought to a stop at the upper limit of its dumping movement, so that the arresting of the motion of the bed will not cause any shock to be transmitted to the car or to the track. The return of the bed to normal position is effected by merely exhausting the energized cylinders, the escaping air cushioning the descent of the bed. By virtue of transposing the point of fulcrum support to the outer pivotal axis 29, the center of gravity of the bed remains an appreciable distance to the inside of the vertical plane of this outer pivotal axis, and hence the return of the bed is always assured.

The stop shoulder 66 which extends down from the under side of the lever or rocker member 54 exercises a controlling function over the links 61 and 62 at the dumping side of the car during a dumping operation. Referring to Figures 5 and 6, it will be seen that in the tilting movement of the bed, and in the concurrent swiveling of the lower rocker member 54 around the pivot pin 53, the shoulder 66 will move upwardly against the under side of the short link 61. This will swing such link upwardly, and thus tend to hold the lower link 62 in a more or less upright position out of engagement with the adjacent sill beam 15. Hence this shoulder 66 prevents any possibility of the lower link 62 striking and becoming wedged against the base flange of the sill beam 15 at the dumping side of the car. The shoulder 66 may also be utilized to exercise a control function over the links 61 and 62 at the rising side of the bed. For example, referring to Figure 5, such shoulder may be arranged to engage the outer side of the link 61 as the bed swings upwardly in the initial part of its movement for holding the short link 61 pressed inwardly toward the center of the car. By thus holding said link at this inwardly extending angle the lower link 62 is held at an angle where its downward pull on the rocker member 54 will act through a longer lever arm. Hence, when the link 62 first becomes effective for arresting motion of the pivot 59, such link will be operating through a relatively long radius arm, which radius arm will decrease in its effective length as the shoulder 66 backs away from the link 61 in the swinging movement of the rocker member 54. The invention also comprehends certain improvements in the mechanism for controlling the side gates 25 which I shall now describe.

At the transverse center of each end of the bed is provided a pivot bolt 71 which is preferably located slightly below the vertical center of the bed. Said pivot bolt extends outwardly beyond the end wall 24 of the bed and has a secondary point of support in an outer plate 72 (Figure 1), which is spaced from the end wall 24. Pivotally mounted on each pivot bolt 71 are two triangular or bell crank levers 73, 74, said levers being oppositely arranged with respect to each other (Fig. 4) so that one of them is adapted to extend toward one side of the bed while the other extends toward the opposite side of the bed. These levers are mounted on the pivot bolt 71 between the end wall 24 and the spaced end plate 72, and are in offset relation in their mounting on the bolt so that in swinging they do not interfere with each other. Each lever 73, 74 has connection with the gate 25 which is opposite thereto, through links 75, 76, which are pivotally connected to the levers by pivot pins 77 and 78 respectively. It will be noted that such pivot pins are carried at the lower corners of the levers 73, 74. The pivot pins engage in longitudinal slots 79 and 80 which are formed in the ends of the links 75, 76, said slots affording a lost motion connection between each link and its pivotal connection with the associated lever. The outer ends of the links 75, 76 are pivotally connected at 82, 83 with side arms 84 which extend inwardly from the ends of the gates 25. Such side arms are disposed approximately in the plane of the aforesaid levers and links, swinging into the space between the end wall 24 and the spaced plate 72 when the gates swing up to closed position. The upper corners of the levers 73, 74 have pivotal connection at 85, 86 with bars 87, 88, which extend downwardly for effecting pivotal connection with the under body 10. Referring to Fig. 1, such pivotal connection is made between spaced depending brackets 89 which are suitably secured to the frame of the under body. A pivot pin 91 extends transversely between each pair of brackets, and the lower end of the associated bar 87 or 88 is pivotally connected to the pin 91 between the spaced brackets 89. Referring to Figures 4 and 6, it will be noted that the axis of each pivot pin 91 is substantially coincident with the pivot axis 28 around which the initial tilting movement of the bed occurs. It will be understood that a similar system of levers, links and bars is provided at the opposite end of the car for assisting in controlling the movement of the gates.

When the car bed is in its transport or horizontal position the side gates are closed and the controlling devices occupy the positions shown in Figure 4. The bars 87, 88 then function as compression members for holding the levers 73, 74 in the upright positions shown. This will hold the pivot pins 77, 78 at the inner ends of the slots 79, 80 and will place the links 75, 76 under tension for holding the gates closed against the outwardly acting pressure of the load. Referring to Figure 6, when the bed is tilted to discharge to the right, the upper pivot 85 of the lever 73 is allowed to swing downwardly with respect to the bed, thereby allowing the lower pivot 77 of such lever to swing to the right for permitting the gate at the right hand side of the car to drop. During this tilting movement the bed is swinging around an axis which is substantially coincident with the pivotal connection of the lower end of the bar 88, and hence the other lever 74 remains in substantially the same angular relation to the bed, so that the gate on the rising side of the bed is held closed. The fact that the fulcrum support of the bed is transposed from the inner pivotal axis 28 to the outer pivotal axis 29 does not materially affect the position of the lever 74, since at the time this occurs the bed is at a sharp angle, and the gate on the rising side of the bed tends to remain closed under its own weight.

Attention is directed to the fact that this construction of gate controlling mechanism actually aids in tilting the bed to dumping position; i. e., the pressure of the load against the gate at the dumping side of the car transmits forces to the gate operating linkage which tend to swing the bed up to a dumping position. This will be evident from the fact that as the bed starts to tilt the load bears with increasing pressure against the gate at the dumping side of the car, and this pressure is transmitted as a tension stress through the link 75 to the lever 73. The rotative force established in said lever acts in turn to establish a compression force in the bar 87 which, reacting against the under body 10, aids in swinging the bed up to its dumping position.

Attention is also directed to the fact that although the gates are positively closed through the control mechanism, they are not positively opened, and hence cannot become damaged by reason of their inability to open completely during a dumping operation. Such non-positive opening of the gates results from the lost motion relation between the pivot pins 77, 78, and the slots 79, 80. The purpose of this arrangement will be illustrated by assuming that during the dumping operation the gate on the dumping side of the car should strike a boulder or any other obstruction which would prevent complete opening of the gate. If the controlling mechanism were of such construction as to positively compel opening of the gate, it will be evident that the gate or the controlling mechanism would be damaged. At such time, however, by providing the lost motion relation referred to, it will be evident that the gate can stop at any point in its opening movement, the pivot pin 77 or 78 thereafter merely sliding freely in its associated slot 79 or 80. Hence the gate opens solely under the action of gravity and under the pressure of the load acting outwardly thereon. It will be evident that this gravity opening and positive closing applies to both gates.

Referring to Figure 1, these dump cars are usually provided with end platforms 92 on which a brakeman can stand for setting the brakes of the car or for performing any other duty in connection with the operation of the car. It is desirable that such brakeman or operator be protected from the possibility of injury from the gate controlling mechanism at the end of the car. To this end a guard plate 93 extends upwardly from the inner edge of the platform, in position to cooperate with the end plate 72 in effecting a substantial closure for the gate operating linkage. These two plates also function to prevent coal, dirt or any refuse matter from dropping into the space occupied by the gate controlling linkage. A flange 94 projects outwardly from the lower edge of the upper guard plate 72. The upper edge of the lower guard plate 93 is curved or bent inwardly as indicated at 95. When the car bed is in its transport or horizontal position the flange 94 lies directly above the inwardly bent portion 95 of the lower guard plate, so that any material spilling from the end of the car will be shed outwardly by the flange 94, assisted by the curved or bent edge 95, so that such material cannot fall into the space occupied by the gate controlling mechanism. The corners of the lower guard plate 93 are cut off on an angle as indicated at 96 so as to prevent the flange 94 from striking the plate 93 in the tilting movement of the bed. To this end, the outer corners or ends of the flange 94 may also be cut away on an angle as indicated at 97 so that the corners of the plate 72 will not strike the upper edge of the lower plate 93. It will be evident that the lower guard plate 93 will effectively safeguard the brakeman against the possibility of slipping into the path of the gate controlling bars and links or allowing his feet to extend beyond the inner edge of the platform into the paths of such bars and links.

While I consider the embodiment hereinabove described to be the preferred form of the invention, nevertheless it will be evident that numerous changes and modifications may be made therein, and I wish it to be understood that the claims hereinafter made are not intended to be restricted to the specific construction shown and described except insofar as details of such construction are particularly included therein. It will also be understood that the reference in the appended claims to a "dump car" is not intended to limit them to a railway car, but is intended to include automobile trucks and other vehicles having dumping bodies.

What I claim as my invention and desire to secure by Letters Patent is:

1. A dump car comprising an under body, a tilting bed tilting about laterally spaced fulcrums on said under body and normally supported in stable equilibrium, power means disposed on either side of said underbody for tilting said bed, and means for causing the bed to move with an accelerated motion during the latter part of its dumping operation.

2. A dump car comprising an under body, a tilting bed tilting about laterally spaced fulcrums on said under body and normally supported in stable equilibrium, power means disposed on opposite sides of said underbody for tilting said bed, and motion transmitting linkage operating to accelerate the movement of said bed during the latter part of its dumping operation.

3. A dump car comprising an under body, a tilting bed for tilting to either side of the car about laterally spaced fulcrums on said underbody and normally supported in stable equilibrium, a substantially vertical power cylinder for tilting said bed, and motion transmitting means connecting said cylinder with said bed and operating to positively accelerate the movement of said bed during the latter part of its dumping operation.

4. A dump car comprising an under body, a tilting bed mounted thereon for dumping to either side of said car, power cylinders for tilting said bed to either side, and motion transmitting linkage connecting said power cylinders with said bed and operating to impart a quick throw to said bed during the latter part of its dumping movement.

5. A dump car comprising an under body, a tilting bed tilting about laterally spaced fulcrums on said under body and normally supported in stable equilibrium, a substantially vertical power cylinder disposed beneath the bed for tilting said bed, and motion transmitting mechanism connecting said cylinder with said bed and arranged for causing said bed to tilt at one speed during the first part of its dumping operation and to continue its tilting movement at a different speed during the latter part of its dumping operation.

6. A dump car comprising an under body, a tilting bed mounted thereon for dumping to either side of said underbody, an upwardly movable single stroke power operated piston for tilting the bed, and motion transmitting linkage mechanism connected directly to and having pivotal connection with said piston and with said bed and operative to increase the range of tilting movement of said bed beyond the stroke of said piston.

7. A dump car comprising an under body, a tilting bed mounted thereon, for dumping to either side of the car about laterally spaced fulcrums, and tilting mechanisms at each side of the car each comprising a power cylinder disposed below the plane of the load carrying surface of said bed for tilting said bed, and means operatively connected with said cylinder and one side of said bed for tilting the latter side of said bed upwardly when said power cylinder is energized, said means comprising motion multiplying mechanism connecting said cylinder with said bed and operative during the latter part of the dumping operation to increase the range of tilting movement of said bed beyond the stroke of said power cylinder.

8. A dump car comprising an under body, a tilting bed mounted thereon for dumping to either side of said underbody, a power cylinder comprising a thrusting element, and motion transmitting mechanism connecting said thrusting element with said bed and comprising means for establishing a direct connection between said thrusting element and said bed during the initial part of the dumping operation, and means for multiplying the motion transmitted from said thrusting element to said bed during the latter part of the dumping operation.

9. A dump car comprising an under body, a tilting bed mounted thereon, a power cylinder for tilting said bed, and motion transmitting mechanism connecting said cylinder with said bed and comprising a motion multiplying lever disposed entirely within the marginal edges of said bed, and means for causing said lever to become effective for increasing the movement transmitted to said bed during the latter part of the dumping operation.

10. A dump car comprising an under body, a tilting bed mounted thereon for dumping to either side of the car about laterally spaced fulcrums, and tilting mechanisms at each side of the car each comprising a power cylinder for tilting said bed, and motion transmitting mechanism comprising a lever through which the power of said cylinder is transmitted to said bed, said lever swinging bodily with said bed during the initial part of the dumping operation, and means movably connected with the underbody for causing said lever to pivot relative to said bed for increasing the movement transmitted thereto during the latter part of the dumping operation.

11. A dump car comprising an under body, a tilting bed mounted thereon, a power cylinder comprising a thrust element, a rocker member normally disposed in angular relation to the longitudinal median line of said underbody and pivotally connected with said thrust element, said rocker member transmitting motion to said bed, and means for arresting movement of one end of said rocker member during the dumping operation to cause pivotal movement of said rocker member during the remaining movement of said bed.

12. A dump car comprising an under body, a tilting bed mounted thereon for dumping to either side of the car, and tilting mechanisms at each side of the car each comprising a power cylinder for tilting the bed to dumping position comprising a thrust element, a rocker member pivotally supported on said thrust element, means operatively connecting one end of said rocker member to said bed, said rocker member extending inwardly therefrom beneath the bed, and means cooperating with the under body for limiting the upward movement of the other end of said rocker member.

13. A dump car comprising an under body, a tilting bed mounted thereon, a power cylinder for tilting said bed comprising an upwardly moving thrust element, a rocker member pivotally supported intermediate its ends on said thrust element, means operatively connecting one end of said rocker member to said bed, and means disposed beneath the bed for arresting upward movement of the other end of said rocker member after said bed has been tilted to a predetermined angle.

14. A dump car comprising an under body, a tilting bed mounted thereon for dumping to either side of the car, and tilting mechanisms at each side of the car each comprising a power cylinder comprising an upwardly moving thrust element, a rocker member pivotally supported intermediate its ends on said thrust element, said rocker member being effective during the first part of the dumping movement to transmit tilting energy to said bed through the opposite ends of said rocker member, and means connected with said under body for limiting upward movement at one end of said rocker member whereby the remaining movement is transmitted to said bed through pivotal action of said rocker member.

15. A dump car comprising an under body, a tilting bed mounted thereon, a power cylinder comprising an upwardly moving thrust element, a rocker member pivotally supported intermediate its ends on said thrust element and arranged so that in the initial part of the bed tilting movement both ends of said rocker member have operative engagement with the bed for transmitting tilting energy thereto, and lost motion means connected with said under body for arresting continued upward movement of one end of said rocker member after said bed has been tilted to a predetermined angle so that said rocker member is caused to pivot relative to said bed in transmitting further movement thereto.

16. A dump car comprising an under body, a tilting bed mounted thereon, a power cylinder comprising a thrust element, a rocker member pivotally supported intermediate its ends on said thrust element, means pivotally connecting one end of said rocker member to said bed, the other end of said rocker member being adapted to transmit upwardly acting thrusting pressure to said bed in the first part of the dumping operation, and means for limiting upward movement of the latter end of said rocker member so that tilting energy is only transmitted to said bed through the pivotal end of said rocker member during the latter part of the dumping operation.

17. A dump car comprising an under body, a tilting bed mounted thereon, a power cylinder mounted on said under body and comprising an upwardly moving thrust element, a rocker member pivotally supported intermediate its ends on said thrust element so as to form a relatively long rocker arm extending in one direction and a relatively short rocker arm extending in another direction, means pivotally connecting the relatively long rocker arm to said bed, the relatively short rocker arm being adapted to transmit upwardly acting thrusting pressure to said bed in the first part of the dumping operation, and link mechanism pivotally connected to said short rocker arm and having lost motion connected with a fixed stop on said under body, said link mechanism operating to limit the upward movement of the short rocker arm whereby tilting movement of the bed during the latter part of the dumping operation is effected entirely through the relatively long arm of said rocker member.

18. A dump car comprising an under body, a tilting bed mounted thereon for dumping to either side of said car, upwardly extending power cylinders pivotally mounted on opposite sides of said under body for tilting said bed in either direction, each of said cylinders comprising an upwardly moving thrust element, and motion transmitting mechanism connecting the thrust element of each cylinder with said bed and comprising a lever pivotally supported intermediate its ends on said thrust element so as to form a relatively long lever arm extending outwardly from said point of pivotal support, and a relatively short lever arm extending inwardly therefrom, means pivotally connecting the long lever arm with the bed, a pressure plate on said short lever arm adapted to transmit upwardly acting tilting pressure to said bed during the first part of the dumping operation, a link pivoted to said short lever arm, a second link pivotally connected to said first link, and a stop member on said under body engaging in a lost motion slot in said second link, said links operating to arrest further upward movement of the short arm of said lever when said bed has been tilted to a predetermined angle for compelling said lever to swing about its pivotal support on said thrust element to transmit continued movement of said thrust element to said bed through the long arm of said lever.

19. A dump car comprising an under body, a tilting bed mounted thereon, a power cylinder comprising an upwardly moving thrust element, a rocker member pivotally supported intermediate its ends on said thrust element and arranged so that in the initial part of the bed tilting movement both ends of said rocker member have operative engagement with the bed for transmitting tilting energy thereto, a pair of links pivotally connected between one end of said rocker member and said under body and comprising lost motion means whereby said links arrest continued upward movement of the latter end of said rocker member after said bed has been tilted to a predetermined angle, and stop means carried by said rocker member for controlling the movement of said links during the movement of said bed.

20. A dump car comprising an under body, a tilting bed mounted thereon, a power cylinder for tilting said bed comprising a thrust element, two tilting mechanisms associated with said cylinder for transmitting tilting movement to said bed, and a yoke pivotally supported on said thrust element and having operative connection with both tilting mechanisms whereby equalized operating energy is transmitted to both tilting mechanisms.

21. A dump car comprising an under body, a tilting bed normally resting on two laterally disposed fulcrums on said under body, means disposed on said underbody for tilting said bed, means operative during the tilting operation for shifting the pivotal center around which said bed tilts, downfolding side gates pivotally mounted on each side of said bed, and gate controlling mechanism for holding the gate at the rising side of the bed closed during tilting and for permitting the gate at the dumping side to open downwardly and for closing said latter gate when the bed is restored to normal position.

22. A dump car comprising an under body, a tilting bed mounted thereon and normally supported in stable equilibrium, power means disposed on opposite sides of said underbody for tilting said bed to either side, a plurality of pivots at each side of the car adapted to alternately support the bed on said under body during a dumping movement to either side, downfolding side gates pivotally mounted on each side of said bed, and gate controlling mechanism for holding the gate at the rising of the bed closed during tilting and for permitting the gate at the dumping side to open downwardly and for closing said latter gate when the bed is restored to normal position.

23. A dump car comprising an under body, a tilting bed normally supported thereon in stable equilibrium, means comprising a power cylinder for tilting said bed, means connecting said power cylinder with said bed, and two coacting pivot devices offset from each side of the longitudinal center line of said under body and said bed arranged for shifting the pivotal center of the bed outwardly with respect to said under body during the dumping operation.

24. A dump car comprising an under body, a tilting bed tilting about laterally spaced pivots on said under body and normally supporting in stable equilibrium on two of said pivots, power means for tilting said bed, means for causing the bed to move with an accelerated motion during the latter part of its dumping operation, and means for transferring the bed from one pivotal center to another during its dumping operation.

25. A dump car comprising an under body, a tilting bed mounted thereon, a power cylinder for tilting said bed, motion transmitting mechanism connecting said cylinder with said bed and arranged for causing said bed to tilt at one speed during the first part of its dumping operation, and to continue its tilting movement at a different speed during the latter part of its dumping operation, and coacting pivot devices on said bed and on said under body for causing the bed to tilt about one center during the first part of its dumping operation and to tilt about another center displaced outwardly therefrom during the latter part of its dumping operation.

26. A dump car comprising an under body, a tilting bed mounted thereon, a power cylinder for tilting said bed, tilting mechanism connecting said cylinder with said bed and normally affording a point of support between said bed and said under body when said bed is in its horizontal position, and pivot devices between said bed and said under body and operative during the tilting movement of the bed for shifting the pivotal center around which said bed tilts and lifting the dumping side of the bed from the point of support afforded by said tilting mechanism.

27. A dump car comprising an under body, a tilting bed mounted thereon, having side dumping gates, gate controlling mechanism at an end of said bed, a platform on said under body beyond the end of said bed, and guard means comprising an upper and a lower plate interposed between said gate controlling mechanism and said platform, one of said plates being fastened to the bed and being adapted to tilt therewith.

28. A dump car comprising an under body, a tilting bed mounted thereon having side dumping gates, gate controlling mechanism at an end of said bed, a brakeman's platform on said under body beyond the latter end of said bed, and coacting plate members on said under body and on said bed, forming a protective closure between said platform and said gate controlling mechanism.

29. A dump car comprising an under body, a laterally tilting bed mounted thereon having side dumping gates, gate controlling mechanism at the opposite ends of said bed, a brakeman's platform on said under body at each end of said bed, a transversely disposed outer plate at each end of said bed extending down over the outer side of said gate controlling mechanism, a transversely disposed guard plate secured to each platform, and coacting surfaces on said plates adapted to shed dirt spilled from the end of the car in a direction outwardly away from said gate controlling mechanism, said plates also establishing a protective guard between said gate controlling mechanism and a brakeman on the platform.

30. A dump car comprising an under body, a tilting bed mounted thereon, a side gate connected with the bed to swing into and out of closed position, and means maintaining connection with the under body at the side of the under body opposite said gate for permitting said gate to open by gravity during the dumping movement of said bed, and for closing said gate positively as said bed is restored to load carrying position.

31. A dump car comprising an under body, a tilting bed mounted thereon, a side gate connected with the bed to swing into and out of closed position, and gate controlling mechanism operatively connected with the under body and with said gate at a point above the hinge axis of the gate and comprising lost motion means for permitting said gate to open nonpositively during the dumping operation, while closing said gate positively when said bed is restored to load carrying position.

32. A dump car comprising an under body, a tilting bed mounted thereon, a side gate connected with said bed to swing into and out of closed position, gate controlling means comprising a lever pivotally connected with the bed, means comprising a tension member connecting said lever with the gate, means pivotally connected with said lever and with the under body and actuated by the tilting of the bed for controlling said gate, and lost motion means interposed in said gate controlling mechanism for permitting the opening of said gate to be interrupted at any point during the tilting movement of the bed.

33. A dump car comprising an under body, a tilting bed mounted thereon, a side gate connected with the bed to swing into and out of closed position, and means for controlling the swinging of the gate comprising a lever pivotally connected with the bed, means pivotally connected with said lever and with the under body and actuated by the tilting of the bed to operate said lever, and means normally operating solely under tension connecting said lever with said gate, said latter means comprising a lost motion connection whereby said gate only opens under the force of gravity and the pressure of the load acting against said gate.

34. A dump car comprising an under body, a tilting bed tilting about laterally spaced pivots on said under body and normally supported in stable equilibrium, means operative during the tilting operation for shifting the pivotal center around which said bed tilts, a downfolding side gate connected with the bed to swing into and out of closed position, and means for automatically controlling the swinging of the gate with the tilting movement of the bed.

35. A dump car comprising an under body, a tilting bed mounted thereon, means for tilting said bed, means operative during the tilting operation for shifting the pivotal center around which said bed tilts, a side gate connected with the bed to swing into and out of closed position, and means for controlling the swinging of the gate comprising a lever pivotally connected with the bed, means connecting said lever with the gate, and means pivotally connected with said lever and being connected with said under body at the side thereof opposite to said gate and actuated by the tilting of the bed to operate said lever to move the gate relatively to the bed.

36. A dump car comprising an under body, a tilting bed mounted thereon, means for tilting said bed to either side, a plurality of pivots at each side of the car adapted to alternately support the bed on said under body during a dumping movement to either side, side gates connected with the opposite sides of the bed to swing into and out of closed position, and means for controlling the swinging of said gates comprising levers pivotally mounted on the bed, devices respectively connecting one of said levers with one of said gates and the other lever with the other gate, and devices pivotally connected with said levers and permanently connected with the under body and actuated by the tilting of the bed to dump its load at one side or the other of the car to move the gate at the dumping side away from its closed position.

37. A dump car comprising an under body, a tilting bed having a side dumping gate, means normally supporting said bed on said under body in stable equilibrium and arranged whereby the bed is lowered relative to said supporting means in the movement of the bed from its normal position to its dumping position, and means actuated by the tilting of said bed to move the gate relatively to said bed.

38. A dump car comprising an under body, a tilting bed mounted thereon, power means disposed on said underbody for tilting said bed to either side, and a plurality of laterally spaced pivots at each side of the car disposed adjacent to the outer sides of the car only and adapted successively to carry the weight of the bed during a dumping movement to either side, whereby the bed is lowered relative to said pivots as the bed moves from its normal position to its dumping position, said bed in its normal position being supported in stable equilibrium on said under body.

39. A dump car comprising an underbody, a tilting bed mounted thereon, and power operated means for tilting the bed to dump the load, including a fluid pressure operated piston rod, and a dumping member pivotally connected with the bed to swing toward and from the dumping side thereof and actuated by projection of the piston rod to apply upward thrust to the bed at a point spaced from its pivotal connection therewith during an early stage of the dumping operation, and to apply such upward thrust nearer to such pivotal connection during a later stage of the dumping operation.

40. A dump car comprising an underbody, a tilting bed mounted thereon, and power operated means for tilting the bed to dump the load, including a fluid pressure operated piston, and a dumping member pivotally connected with the bed to swing toward and from the dumping side thereof and adapted to bear against the bed at a point spaced from its pivotal connection therewith to transmit upward thrust to the bed during an early stage of the dumping operation, and means for swinging said dumping member during a later stage of the dumping operation to transmit upward thrust to the bed through said pivotal connection.

41. A dump car comprising an underbody, a tilting bed mounted thereon, upwardly extending power operated means for tilting the bed to dump the load, including a fluid pressure operated piston rod adapted by its projection to apply upward thrust to the bed, and power transmitting means actuated by the projection of the piston rod to reduce its initial leverage upon the bed during a later stage of the dumping operation.

42. A dump car comprising an underbody, a tilting bed mounted thereon, power operated means for tilting the bed to dump the load, including an oscillating cylinder mounted on the underbody, a fluid pressure operated piston operating in said cylinder and having a piston rod adapted to be projected to tilt the bed, and means actuated by the upward projection of the piston rod to swing said rod through an arc counterwise to the arc described by the tilting bed.

43. A dump car comprising an underbody, a tilting bed mounted thereon, power operated means for tilting the bed to dump the load, including a fluid pressure operated piston rod adapted by its projection to apply upward thrust to the bed, and power transmitting means normally lying at an angle to said piston rod and movable into substantial alignment therewith during a later stage of the dumping operation, to deliver the upward thrust to the bed.

44. A dump car comprising an underbody, a tilting bed mounted thereon, power operated means for tilting the bed to dump the load, including a fluid pressure operated piston rod adapted by its projection to apply upward thrust to the bed, and power transmitting means pivotally connected with the bed and normally lying at an angle to the piston rod, said power transmitting means being movable into substantial alignment with said piston rod during a later stage of the dumping operation.

45. A dump car comprising an underbody, a tilting bed mounted thereon, power operated means for tilting the bed to dump the load, including a fluid pressure operated piston rod adapted by its projection to apply upward thrust to the bed, power transmitting means pivotally connected with the bed and normally lying at an angle to the piston rod, and means pivotally connected with said power transmitting means and with the underbody and operable by the projection of the piston rod to move said power transmitting means toward a position of alignment with said piston rod.

46. A dump car comprising an underbody, a tilting bed mounted thereon, power operated means for tilting the bed to dump the load, including a fluid pressure operated piston rod, power transmitting means pivotally connected with the bed at a point normally lying at one side of said piston rod, and means connected with said power transmitting means and with the underbody and actuated by the projection of the piston to move said power transmitting means toward a position of alignment with said piston rod.

47. A dump car comprising an underbody, a tilting bed mounted thereon, power operated means for tilting the bed to dump the load, including an oscillating cylinder mounted on the underbody, a fluid pressure operated piston operating in said cylinder and having a piston rod adapted to be projected to tilt the bed, power transmitting means pivotally connected with the bed at a point normally lying at one side of said piston rod, and means actuated by the projection of the piston rod to move said power transmitting means and the piston rod toward a position of alignment with each other.

48. In a dump car, the combination of an underbody comprising a longitudinally extending sill structure and crosswise frame members at both sides of the underbody projecting outwardly from said sill structure, said crosswise frame members comprising inner and outer curved fulcrum surfaces adjacent to the outer ends of said frame members and disposed at both sides of the car, a tilting bed adapted to dump to either side of the car, said bed comprising inner and outer curved fulcrum surfaces at each side thereof, the upper fulcrum surfaces of said bed cooperating with the lower fulcrum surfaces of said frame members to cause part of the dumping movement of the bed to occur about the inner fulcrum surfaces and the final movement to occur about the outer fulcrum surfaces at the dumping side of the car, side gates for said bed connected therewith to swing outwardly and downwardly to open position, and gate controlling mechanisms permitting the gate at the dumping side of the bed to open while holding the gate at the rising side closed.

49. In a dump car, the combination of an underbody comprising a longitudinally extending sill structure and crosswise frame members at both sides of the underbody projecting outwardly from said sill structure, said crosswise frame members comprising inner and outer curved fulcrum surfaces spaced outwardly from said sill structure and disposed at both sides of the car, a tilting bed normally supported in stable equilibrium and adapted to dump to either side of the car, said bed comprising inner and outer curved fulcrum surfaces at each side thereof, the upper fulcrum surfaces of said bed cooperating with the lower fulcrum surfaces of said frame members to cause part of the dumping movement of the bed to occur about the inner fulcrum surfaces and the final movement to occur about the outer fulcrum surfaces at the dumping side of the car, side gates for said bed connected therewith to swing outwardly and downwardly to open position, and gate controlling mechanisms pivotally connected with said under body and holding said gates closed when said bed is in its normal upright position but permitting the gate at the lower side of the bed to open in the dumping operation.

50. In a dump car, the combination of an underbody comprising a longitudinally extending sill structure and transversely extending frame members projecting outwardly from the sides of said sill structure at spaced points along the length of the car, a pair of fulcrum supports on each of said frame members at each side of the car spaced outwardly from said sill structure and with the two supports of each pair in inner and outer transversely spaced relation, a tilting bed normally supported in stable equilibrium and adapted to dump to either side of the car, pairs of fulcrums at opposite sides of said bed adapted to cooperate with said fulcrum supports whereby during part of the dumping movement of the bed the latter rocks on said inner fulcrum supports at the dumping side and thereafter the weight of the bed is transferred to said outer fulcrum supports and on which the bed completes its dumping movement, side gates pivotally connected with said bed to swing outwardly and downwardly to open position, and gate controlling mechanism having operative association with said underbody and adapted to permit the gate at the dumping side of the bed to open while holding the gate at the rising side closed.

51. In a dump car, the combination of an underbody, a tilting bed normally supported thereon in stable equilibrium and adapted to tilt to either side of the car in dumping, cooperating inner pivot members on said underbody and on said bed at each side of the car and spaced outwardly from the longitudinal center of the underbody, said bed tilting on said inner pivot members at the dumping side during part of the dumping movement, cooperating surfaces associated with said inner pivot members for holding the bed against sidewise displacement relative to said underbody during such portion of the dumping movement, outer pivot members on said underbody and bed comprising cooperating pin and socket members at each side of the car and spaced outwardly from said inner pivot members, said bed transferring its weight from said inner to said outer pivot members during the dumping movement and completing said movement about said outer pivot members, opposite side gates pivotally connected with said bed to swing downwardly into open position, and gate controlling mechanisms cooperating with the movement of the bed for permitting the gate at the dumping side of the bed to open and for closing said gate when the bed is restored to load carrying position.

52. In a dump car, the combination of an underbody comprising a longitudinally extending sill structure, crosswise frame members extending outwardly from said sill structure, a tilting bed normally resting directly on said sill structure, means for tilting said bed to dump to either side of the car, and means disposed on said frame members and on said bed below the plane of the load carrying surface thereof for shifting the pivotal center around which said bed tilts during a dumping operation.

53. In a dump car, the combination of an underbody comprising a longitudinally extending sill structure, crosswise frame members extending outwardly from said sill structure, a tilting bed normally resting directly on said sill structure, means for tilting said bed to dump to either side of the car, dual pivots disposed on said frame members, and means disposed on said bed below the plane of the load carrying surface thereof and cooperating with said dual pivots for alternately supporting the bed during a dumping movement thereof.

54. In a dump car, the combination of an underbody comprising a longitudinally extending sill structure, crosswise frame members extending outwardly from said sill structure, a tilting bed normally resting directly on said sill structure in stable equilibrium, means for tilting said bed to dump to either side of the car, a plurality of fulcrums disposed on said frame members adjacent the outer ends thereof, and a plurality of fulcrums disposed on said bed below the plane thereof and cooperating with the fulcrums on said frame members for shifting the pivotal center around which said bed tilts during a dumping operation.

55. In a dump car, the combination of an underbody comprising a longitudinally extending sill structure, crosswise frame members at both sides of said sill structure projecting outwardly therefrom, a tilting bed normally resting directly on said sill structure and adapted to dump to either side of said car, power means for tilting said bed to either side, and coacting pivot devices disposed on said frame members and on said bed below the plane thereof and arranged for shifting the pivotal center of the bed outwardly with respect to said sill structure during a dumping movement of said bed to either side.

56. A dump car comprising an underbody, a tilting bed mounted thereon for dumping to either side of said car about laterally spaced fulcrums, side gates connected with said bed to swing into and out of closed position, and gate controlling mechanism for each gate disposed beyond the opposite ends of the bed for holding the gate at the rising side of the bed closed and for permitting the gate at the dumping side of said bed to open non-positively by gravity during a dumping movement of said bed and for closing said latter gate positively as said bed is restored to load carrying position, the gate controlling mechanism for each gate comprising a member pivotally connected with the underbody at the side opposite to the side of the gate controlled by that mechanism.

57. A dump car comprising an underbody, a tilting bed normally supported in stable equilibrium on said underbody and adapted to tilt to either side thereof about laterally spaced fulcrums on said underbody, side gates connected with the bed to swing into and out of closed position and gate controlling mechanism for said gates comprising members mounted on opposite ends of the bed and including lost motion means for permitting the gate at the dumping side of the bed to open non-positively during the dumping operation while closing said gate positively when said bed is restored to load carrying position and for holding the gate at the rising side of the bed closed during such operation.

58. In a dump car, the combination of an underbody comprising two closely disposed longitudinally extending sill beams extending substantially from end to end of the underbody, plate means secured to the top surfaces of said sill beams and defining substantially flat supporting surfaces across the top of said sill beams, crosswise frame members secured to the outer sides of both of said sill beams and projecting outwardly therefrom towards the sides of the car, means on said crosswise frame members defining a pair of adjacent inner and outer fulcrum surfaces, the pairs of fulcrum surfaces at opposite sides of the car being disposed below the flat supporting surfaces on said sill beams, a load carrying bed comprising side rails substantially at the side margins of the bed, a plurality of beams disposed at longitudinally spaced points along the length of the bed and extending crosswise the entire width of the bed with their ends secured to the inner sides of said side rails, side dumping gates hingedly connected with the outer sides of said side rails, said crosswise bed beams normally resting on said flat supporting surfaces across the tops of said sill beams when the bed is in transport position, and brackets secured to the under side of the bed at opposite sides thereof and each comprising means defining a pair of adjacent inner and outer fulcrum surfaces adapted to cooperate with the inner and outer fulcrum surfaces on said frame members whereby in the dumping of the bed the weight of the bed is transferred from the cooperating inner fulcrum surfaces to the cooperating outer fulcrum surfaces.

59. In a dump car, the combination of an under body comprising two closely disposed longitudinally extending sill beams extending substantially from end to end of the under body, the top surfaces of said sill beams defining longitudinally extending centrally disposed supporting surfaces on said under body, crosswise frame members secured to said sill beams and projecting outwardly therefrom towards the sides of the car, means on said crosswise frame members defining a pair of adjacent inner and outer fulcrum surfaces, the pairs of fulcrum surfaces on opposite sides of the car being disposed below the centrally disposed supporting surfaces on said sill beams, a load carrying bed comprising side rails, a plurality of crosswise beams disposed at longitudinally spaced points along the length of the bed, side dumping gates hingedly connected with said side rails, said crosswise bed beams normally resting on said centrally disposed supporting surfaces on the tops of said sill beams when the bed is in transport position, and brackets secured to the under side of the bed at opposite sides thereof and each comprising means defining a pair of adjacent inner and outer fulcrum surfaces adapted to cooperate with the inner and outer fulcrum surfaces on said frame members whereby in the dumping of the bed the weight of the bed is transferred from the cooperating inner fulcrum surfaces to the cooperating outer fulcrum surfaces.

60. In a dump car, the combination of an under body comprising a longitudinally extending sill structure having an upper surface forming a centrally disposed supporting surface on said under body, crosswise frame members secured to said sill structure and projecting outwardly therefrom towards the sides of the car, said frame members comprising fulcrum surfaces disposed adjacent to the outer ends of said members, a load carrying bed normally supported in stable equilibrium on said under body, said bed comprising side rails substantially at the side margins of the bed, a plurality of beams disposed at longitudinally spaced points along the length of the bed and extending crosswise of the bed with their ends secured to the inner sides of said side rails, side dumping gates hingedly connected with said side rails, a plurality of said crosswise bed beams normally resting on said centrally disposed supporting surface on said sill structure when the bed is in transport position, and brackets secured to the under side of the bed at opposite sides thereof and comprising fulcrum surfaces adapted to cooperate with the fulcrum surfaces on said crosswise frame members for supporting the bed in its dumping movement.

61. A dump car comprising an under body, a tilting bed mounted upon said under body and normally supported in stable equilibrium thereon, said bed comprising longitudinally extending side rails, a plurality of closely spaced transversely extending beam members secured to said side rails and adapted in the normal position of said bed to rest directly upon said under body, power operated means for tilting the bed to dump the load, and coacting pivot devices associated with said transversely extending beam members and with said under body and arranged for shifting the pivotal center of said bed outwardly with respect to said under body during the dumping operation.

62. In a dump car, the combination of an under body comprising a longitudinally extending sill structure, a tilting bed normally supported in stable equilibrium on said under body, said bed adapted to tilt to either side of said sill structure and comprising longitudinally extending side rails and transversely extending beam members secured to said side rails, a plurality of said transversely extending beam members being adapted in the normal position of said bed to rest directly upon said sill structure, power operated means for tilting the bed to dump the load, and dual pivots associated with said transversely extending beams and with said sill structure and adapted to alternately support the bed during a dumping operation.

63. A railway dump car comprising an under body, a tilting bed, power cylinders on the car operatively arranged to impart upward thrusting motion to the bed for causing said bed to dump to either side of the car, said under body comprising a longitudinally extending sill structure, said bed normally resting on said sill structure so as to be normally held in stable equilibrium thereby, crosswise frame members secured to said sill structure, and projecting outwardly therefrom, the outer portions of said crosswise frame members comprising bearing surfaces at opposite sides of the underbody, cooperating bearing surfaces on the under side of said bed adapted to engage said bearing surfaces on said crosswise frame members at different laterally spaced points, whereby the weight of the bed at the dumping side is transferred from one point of support on said bearing surfaces outwardly to another point of support thereon during the dumping of the bed, downfolding side gates hingedly connected to the side portions of said bed at opposite sides thereof, and gate controlling mechanism for holding the gate at the rising side of the bed closed during dumping and for permitting the gate at the dumping side to open downwardly and for closing said latter gate when the bed is restored to normal position.

64. A railway dump car comprising an under body, a tilting bed, power cylinders on the car for tilting the bed to dump to either side, said under body comprising bearing surfaces spaced outwardly from the longitudinal central plane of the car at opposite sides thereof, cooperating bearing surfaces on the under side of said bed normally engaging said bearing surfaces on said under body at points at opposite sides of the car for normally supporting the bed in stable equilibrium thereon, said bearing surfaces on the bed also adapted to engage said bearing surfaces on the under body at different outwardly spaced points in the tilting operation, whereby after the bed has been tilted through a considerable part of its dumping movement the weight of the bed at the dumping side is transferred from one point of support on said bearing surfaces outwardly to another point of support thereon, cooperating laterally abutting surfaces associated with said bearing surfaces to prevent sidewise slipping of the bed on said bearing surfaces in the tilting of the bed, downfolding side gates hingedly connected to the side portions of said bed at opposite sides thereof, and gate controlling mechanism for holding the gate at the rising side of the bed closed during dumping and for permitting the gate at the dumping side to open downwardly and for closing said latter gate when the bed is restored to normal position.

65. In a dumping device embodying a dumping body characterized by a low load carrying position and by a high dumping position, and a base for supporting the dumping body, the combination of the sides or a side of the dumping body attached thereto in such a manner as to permit outward and downward opening of the side by gravity, and power means for effecting movement of the body in dumping and righting and embodying mechanism for applying maximum force directly to maximum burden and indirectly applying a diminished force to extended movement of a diminished burden and including a system of levers inoperative during initial dumping movement and operative thereafter.

66. In a dump car, a car body and a motor cylinder for the dumping thereof, a piston in said cylinder and a piston rod attached to said piston to directly apply the power in the initial stages of the dumping movement, a lever combination in operative connection with the piston rod, said lever combination having a member connected to the car body and another member in loose engagement with the underframe, said lever combination being instrumental in the dumping of the car body in the later stages of the dumping after the slack has been taken up in said loose engagement.

67. In a dumping device, a supporting base, a dumping body mounted theeron for tilting movement, and a power actuator therefor comprising a primary means engaging said body to initiate tilting thereof and secondary means associated with said primary means and engaging the body and operative after initiation of tilting movement to multiply the movement of said primary means.

68. A dump car comprising, in combination, an underframe structure, a dumping body mounted thereon for tilting movement, a power actuator positioned for direct engagement with said body to initiate tilting thereof, and a link mechanism associated with said actuator and said body, said mechanism being inoperative during initial tilting movement but operative thereafter to transmit the movement of said actuator in a modified form to said body.

69. A dumping device for use on railroad cars or the like, comprising, in combination, a supporting base, a dump body mounted thereon for tilting movement, a power actuator positioned for direct engagement with said body to initiate tilting thereof, and a system of levers whose mechanical advantage is less than one, adapted after predetermined movement of said actuator to be operatively interposed between said body and said actuator.

70. In a railway dump car, the combination of an underframe structure, a dumping body mounted thereon for tilting to either side, and reciprocatory power means positioned beneath said body and operable to import the movement thereof directly to said body to initiate tilting thereof and to impart amplified movement of the power means to complete the tilting thereof.

71. In a railway dump car, the combination of an underframe structure, a dumping body mounted thereon for tilting to either side, and tilting means positioned beneath said body comprising a reciprocatory power actuator and lever mechanism and operable to impart the movement of said actuator directly to said body to initiate tilting thereof and to impart amplified movement with diminished force to complete the tilting thereof.

72. In a railway dump car, the combination of an underframe structure, a dumping body mounted thereon for tilting to either side, and power means for tilting said body comprising a cylinder mounted on said underframe beneath said body, a piston in said cylinder, a piston rod projecting upwardly through said cylinder, a lever pivotally secured to said piston rod, said lever having an engagement at one end with said body, initial movement of the piston being imparted directly to said body and effecting bodily movement of said lever, and a member depending from the other end of said lever and having a lost motion connection with said underframe to limit the bodily movement of said lever, whereby the effective movement of said piston is amplified by said lever.

73. In a railway dump car, the combination of an underframe structure, a dumping body mounted thereon for tilting to either side, and power means for tilting said body comprising a cylinder, a piston in said cylinder, a piston rod projecting through the top of said cylinder, a lever pivoted on said piston rod intermediate the ends of the lever and having a connection at one end with said body, said cylinder being mounted on said underframe below said body substantially in vertical position to impart the initial upward thrust of said piston directly to said body and without the production of a bending moment acting on the piston rod, and a lost motion connection between the other end of said lever and said underframe, whereby after predetermined movement of the piston said lever is operatively interposed between said piston and said body.

74. In a dumping device, a supporting base, a dumping body mounted thereon, cooperating means on the supporting base and on the dumping body for supporting the dumping body throughout the tilting of the body for dumping, said cooperating means embodying on the supporting base a plurality of laterally positioned points of support and on the dumping body a plurality of corresponding laterally positioned points of support, and power means operable to apply maximum force to said body to initiate tilting thereof and diminished force with amplified movement to complete the tilting thereof, the engagement of the said points of support advancing to final lateral position during the tilting movement, which final position at the end of the tilting movement is the extreme lateral position.

75. In a dump car having a tiltable body, in combination, an underframe, a body, transversely disposed members beneath said body engaging with the underframe to maintain said body in stable equilibrium, said body turning about such members in the initial dumping movements and trunnions spaced outwardly of said bearings and beneath the body about which the body completes the dumping movement.

76. A dump car of the class described comprising an under frame, a tilting bed mounted thereon for dumping to either side of the car, downfolding side gates at opposite sides of the bed, power cylinders on opposite sides of said under frame for dumping said bed to either side of the car, and mounting means between said bed and said under frame comprising cooperating pairs of fulcrum pins and fulcrum sockets adapted to establish a fixed inner fulcrum axis and a fixed outer fulcrum axis to each side of the center line of the car around which substantial portions of the tilting motion of the bed successively occur in a dumping operation to either side of the car, the fulcrum pins and fulcrum sockets which establish the inner fulcrum axes cooperating to normally maintain said bed in substantially stable equilibrium, the fixed outer fulcrum axis being disposed outwardly beyond the vertical plane of the center of gravity of the empty bed when the latter is in its final position of dumping with the downfolding gate at the dumping side in completely open position, whereby the bed is inherently self-righting after dumping.

77. A dump car comprising an under frame, a tilting bed adapted to dump to either side of the car, mounting means between said bed and said under frame comprising cooperating fulcrum elements carried by said under frame and by said bed and adapted to establish a fixed inner fulcrum axis and a fixed outer fulcrum axis to each side of the center line of the car around which substantial portions of the tilting motion of the bed successively occur in a dumping operation to either side of the car, the fulcrum elements which establish the inner fulcrum axes cooperating to normally maintain said bed in substantially stable equilibrium, and selectively operable dumping mechanisms for tilting said bed to either side of the car, each of said dumping mechanisms comprising a power actuated member for transmitting an upward thrust to one side of the bed, and motion multiplying means for extending the range of motion transmitted from said power actuated member to the bed.

78. A dump car comprising an under frame, a tilting bed mounted thereon, mounting means between said bed and said under frame comprising cooperating fulcrum elements carried by said under frame and by said bed and adapted to establish a fixed inner fulcrum axis and a fixed outer fulcrum axis to each side of the center line of the car around which substantial portions of the tilting motion of the bed successively occur in a dumping operation to either side of the car, the fulcrum elements which establish the inner fulcrum axes cooperating to normally maintain said bed in substantially stable equilibrium, downfolding side gates pivotally mounted on each side of said bed, and gate controlling mechanism for permitting the gate at the dumping side to open downwardly and for closing said latter gate when the bed is restored to normal position.

79. A dump car comprising an under frame, a tilting bed mounted thereon, cooperating fulcrum elements adapted to establish a plurality of fulcrum axes around which successive portions of the tilting motion of the bed occur in a dumping operation, a power cylinder for tilting said bed, and motion transmitting mechanism interposed between said cylinder and said bed, said motion transmitting mechanism comprising an upwardly moving thrusting element, a rocker member pivotally mounted on said thrusting element, and means for causing said rocker member to become effective for increasing the movement transmitted to said bed during the latter part of the dumping operation, said latter means causing said rocker member to rotate in a direction corresponding to the direction of angular motion of the bed during the dumping operation.

80. A dump car comprising an under frame, a tilting bed mounted thereon, power means for tilting said bed, and motion transmitting mechanism interposed between said power means and said bed, said motion transmitting mechanism comprising an upwardly moving thrusting element, a member pivotally mounted on said thrusting element, and means for causing said pivotally mounted member to become effective for increasing the movement transmitted to said bed during the latter part of the dumping operation, said latter means causing said pivotally mounted member to rotate in a direction corresponding to the direction of angular motion of the bed during the dumping operation.

81. A dump car comprising an under frame, a tilting bed mounted thereon, power means for tilting said bed, and motion transmitting mechanism interposed between said power means and said bed, said motion transmitting mechanism comprising an upwardly moving thrusting element, a member pivotally mounted on said thrusting element to swing substantially in the plane of tilting movement of the bed, and means for causing said member to become effective for increasing the movement transmitted to said bed during the latter part of the dumping operation, said pivotally mounted member having its outer end arranged to impart upward force to the rising side of the bed.

82. A dump car comprising an under frame, a tilting bed adapted to dump to either side of the car, downfolding side gates at opposite sides of the bed, upwardly extending power cylinders at opposite sides of said under frame for dumping said bed to either side of the car, said under frame comprising a longitudinally extending sill structure, said bed comprising side rails substantially at the side margins of the bed and cross beams at longitudinally spaced points along the length of the bed and having their ends secured to said side rails, said cross beams normally having load bearing engagement on said sill structure, brackets projecting outwardly from said sill structure, fulcrum elements carried by said brackets spaced outwardly from said sill structure, and fulcrum elements carried by said bed cooperating with the fulcrum elements carried by said brackets, said cooperating fulcrum elements defining a fixed fulcrum axis at each side of the car around which the bed has tilting motion in the dumping operation, aid fulcrum elements cooperating to normally maintain said bed in substantially stable equilibrium.

83. In a dump car, in combination, an under frame, a tiltable body, transversely spaced bearings on the underframe beneath the body which maintain the body in stable equilibrium, bearings spaced outwardly thereof about which the body moves to dumped position, said latter bearings being normally out of engagement with each other and providing a tilting axis so disposed as to aid the body dumping mechanism by utilizing the momentum gained by the initial dumping movement from stable equilibrium to pivoting position.

84. In a dump car, in combination, an under frame, a laterally tilting body, transversely spaced bearings on the body and under frame, beneath the body, maintaining the body in stable equilibrium, bearings beneath the body and spaced outwardly of the first mentioned bearings upon which the body pivots to final dumping position, said latter mentioned bearings being spaced vertically with respect to each other when the body is in stable equilibrium and when in engagement forming a tilting axis below the plane of engagement of the bearings supporting the body in stable equilibrium.

85. In a dump car, the combination of an under frame, a tilting bed adapted to dump to either side of the car, downfolding side gates at opposite sides of said bed, transversely spaced members beneath said bed and fixedly secured thereto and engaging with the under frame to maintain said bed in stable equilibrium, said bed turning about such members in the initial dumping movement, and trunnions spaced outwardly of said members and beneath the bed about which the bed completes the dumping movement.

WILLIAM L. BURNER.

CERTIFICATE OF CORRECTION.

Patent No. 2,143,934.                               January 17, 1939.

WILLIAM L. BURNER.

It is hereby certified that error appears in the printed specification of the above numbered patent requiring correction as follows: Page 7, second column, line 36, claim 17, for the word "connected" read connection; page 8, second column, line 69, claim 31, for "axis" read axes; page 10, second column, line 43, claim 50, for "mechanism" read mechanisms; page 11, first column, line 46, claim 55, for "thereor" read thereof; same page, second column, line 13, claim 58, for "top" read tops; page 13, first column, line 21, claim 70, for "import" read impart; page 14, second column, line 21, claim 82, for "aid" read said; and that the said Letters Patent should be read with this correction therein that the same may conform to the record of the case in the Patent Office.

Signed and sealed this 2nd day of May, A.D. 1939.

Henry Van Arsdale (Seal)                                    Acting Commissioner of Patents.